United States Patent [19]
Gancarcik et al.

[11] Patent Number: 5,889,858
[45] Date of Patent: Mar. 30, 1999

[54] STANDBY HIGH VOLTAGE ANALOG LINE FEED

[75] Inventors: Edward P. Gancarcik, Ottawa; Chuk Wally Seto, Almonte, both of Canada

[73] Assignee: Mitel Corporation, Kanata, Canada

[21] Appl. No.: 675,111

[22] Filed: Jul. 3, 1996

[51] Int. Cl.⁶ .................................................. H04M 1/00
[52] U.S. Cl. ...................... 379/413; 379/377; 379/422
[58] Field of Search .................................. 379/413, 377, 379/382, 422

[56] References Cited

U.S. PATENT DOCUMENTS

| | | | |
|---|---|---|---|
| 5,343,514 | 8/1994 | Snyder | 379/93 |
| 5,721,774 | 2/1998 | Stiefel | 379/413 |

OTHER PUBLICATIONS

Newton's Telecom Dictionary, By Harry Newton 8$^{th}$ Edition pp. 768–770, Nov. 1994.

*Primary Examiner*—Fan S. Tsang
*Assistant Examiner*—Shih-Wen Hsieh
*Attorney, Agent, or Firm*—Pascal & Associates

[57] ABSTRACT

A standby feed circuit for a subscriber line comprising a constant current power feeding circuit for a subscriber line for supplying a voltage to a subscriber line at a voltage less than a standard central office power feeding circuit, a voltage source for providing the standard voltage, apparatus for applying the standard voltage when a station apparatus connected to the subscriber line is in an on-hook condition, and apparatus for applying said voltage less than the standard voltage in place of the standard voltage when the station apparatus is in an off-hook condition.

1 Claim, 2 Drawing Sheets

STANDBY HIGH VOLTAGE ANALOG LINE FEED

FIELD OF THE INVENTION

This invention relates to the field of telephony, and in particular to a current feeding circuit for a subscriber line.

BACKGROUND TO THE INVENTION

Central offices supply typically 48 volts to subscriber lines; when a substantially increased current (as distinguished from leakage current) flows down the subscriber line, the central office considers that a station apparatus connected to the line has gone off-hook. Since subscriber lines are of various lengths (some lines being very long), and thus of various resistances, the central office power supplies typically provides full 48 volts to the lines in order to ensure that sufficient current flows in an off-hook condition which will be detected at the central office.

PBXs on the other hand typically operate with much shorter subscriber lines, and therefore do not expect high resistance in the lines. Thus to save cost, their power supplies often supply voltage much lower than central offices (e.g. 27 volts), with the expectation that the lower voltage is what would often be found at the end of a long subscriber line connected to a central office, off-hook current at this lower voltage would be able to be detected, and the system would operate satisfactorily.

Many telephone sets which provide PBX types of features are designed to work with central offices. They are thus designed to operate using the line voltage supplied from a PBX, i.e. in the 48 volt range. If there are two telephone sets connected to one line and one of them goes off-hook, the other one will sense the lower voltage across the line when the first one is busy and will indicate to the user of the other set that the line is busy. This is illustrated in FIG. 1, in which two telephone sets 1A and 1B are connected to a line 3 which is connected to central office 5. Set 1A is shown off-hook and set 1B indicates BUSY on its display.

However, in the case in which the voltage at the telephone sets is lower in the first place, e.g. 27 volts as supplied from a PBX, both sets could detect the lower voltage even if none is are off-hook, and as a result both indicate that the line is busy, prohibiting their use.

Thus station apparatus such as feature telephone sets, fax machines, modems, etc., which sense voltage levels across the telephone line in order to determine if the line is busy, may not operate correctly if operating from a low voltage power supply circuit, such as that supplied from many PBXs.

There has been no way of knowing, other than by trial and error, which station apparatus would be compatible with the lower voltage lines. Those that worked in a connected up and tested state would be accepted, and those that did not were not used for this purpose. There are a large number of different types and suppliers of such station apparatus, and operability has been typically determined in the field, by set-up on the line to be used. Returning apparatus that does not work, and determining apparatus that does work by trial and error, wastes time, is costly, and is annoying, both to the purchaser and to the supplier.

SUMMARY OF THE INVENTION

The present invention solves the aforenoted problems by providing a standard voltage as is typically provided by a central office, to the PBX subscriber line, only at the time that the station apparatus is on-hook. Once the apparatus is off-hook, the higher voltage is switched out in favor of the lower voltage. As a result, the station apparatus that detects line voltage to properly determine the state of the line obtains the standard high voltage when the line is idle, and will operate correctly without trial and error testing.

However, since the high voltage is only used during the on-hook state of the station apparatus, it need not supply large amounts of current, and thus can be relatively inexpensive.

In accordance with an embodiment of the invention, a standby feed circuit for a subscriber line is comprised of apparatus for applying a high voltage power supply to the subscriber line when the subscriber line is idle, and for switching to a lower voltage constant current power supply to the subscriber line in place of the high voltage power supply when the subscriber line is busy.

In accordance with another embodiment, a standby feed circuit for a PBX subscriber line is comprised of a constant current power feeding circuit for a subscriber line for supplying a voltage to a subscriber line at a voltage less than a standard central office power feeding circuit, a voltage source for providing the standard voltage, apparatus for applying the standard voltage when a station apparatus connected to the subscriber line is in an on-hook condition, and apparatus for applying the voltage less than said standard voltage in place of the standard voltage when the station apparatus is in an off-hook condition.

BRIEF INTRODUCTION TO THE DRAWINGS

A better understanding of the invention will be obtained by considering the detailed description below, with reference to the following drawings, in which:

FIG. 1 is a block diagram of a subscriber line in accordance with the prior art, and FIG. 2 is a schematic diagram of an embodiment of the present invention.

DETAILED DESCRIPTION OF PREFERRED EMBODIMENT

Figure 1:
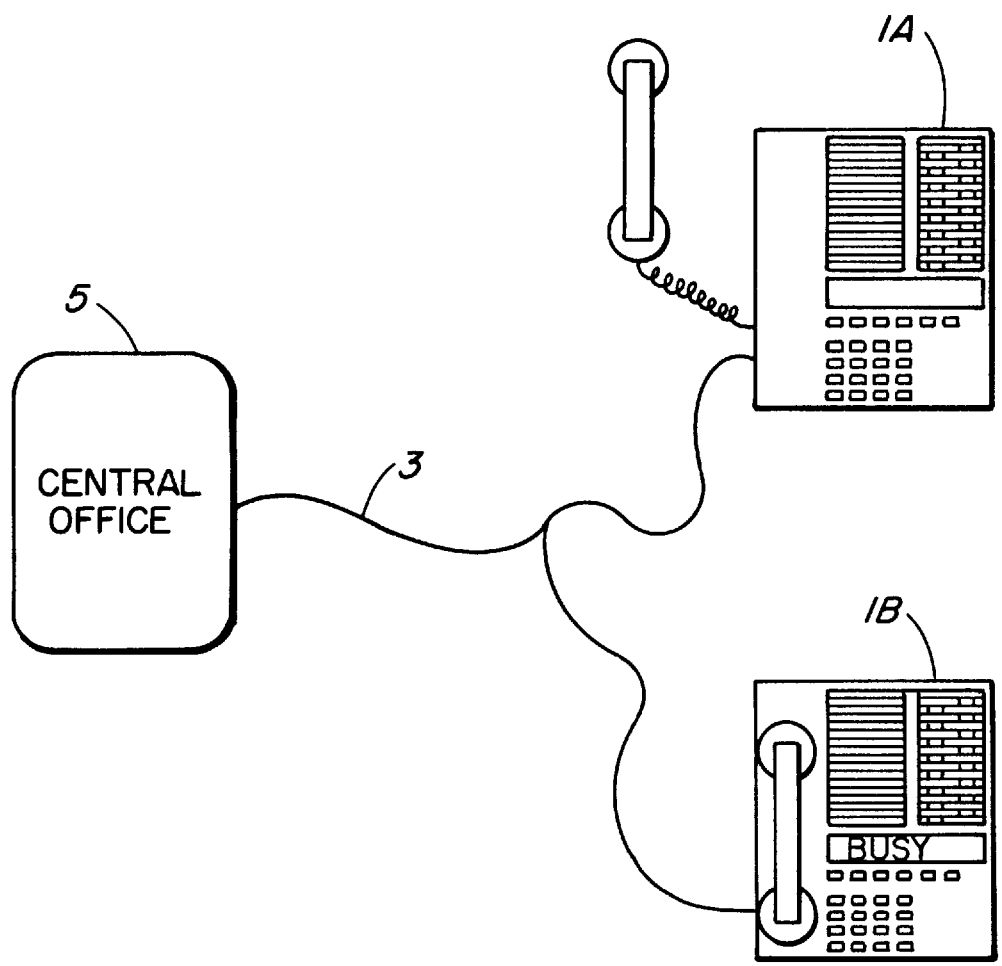
Figure 2:
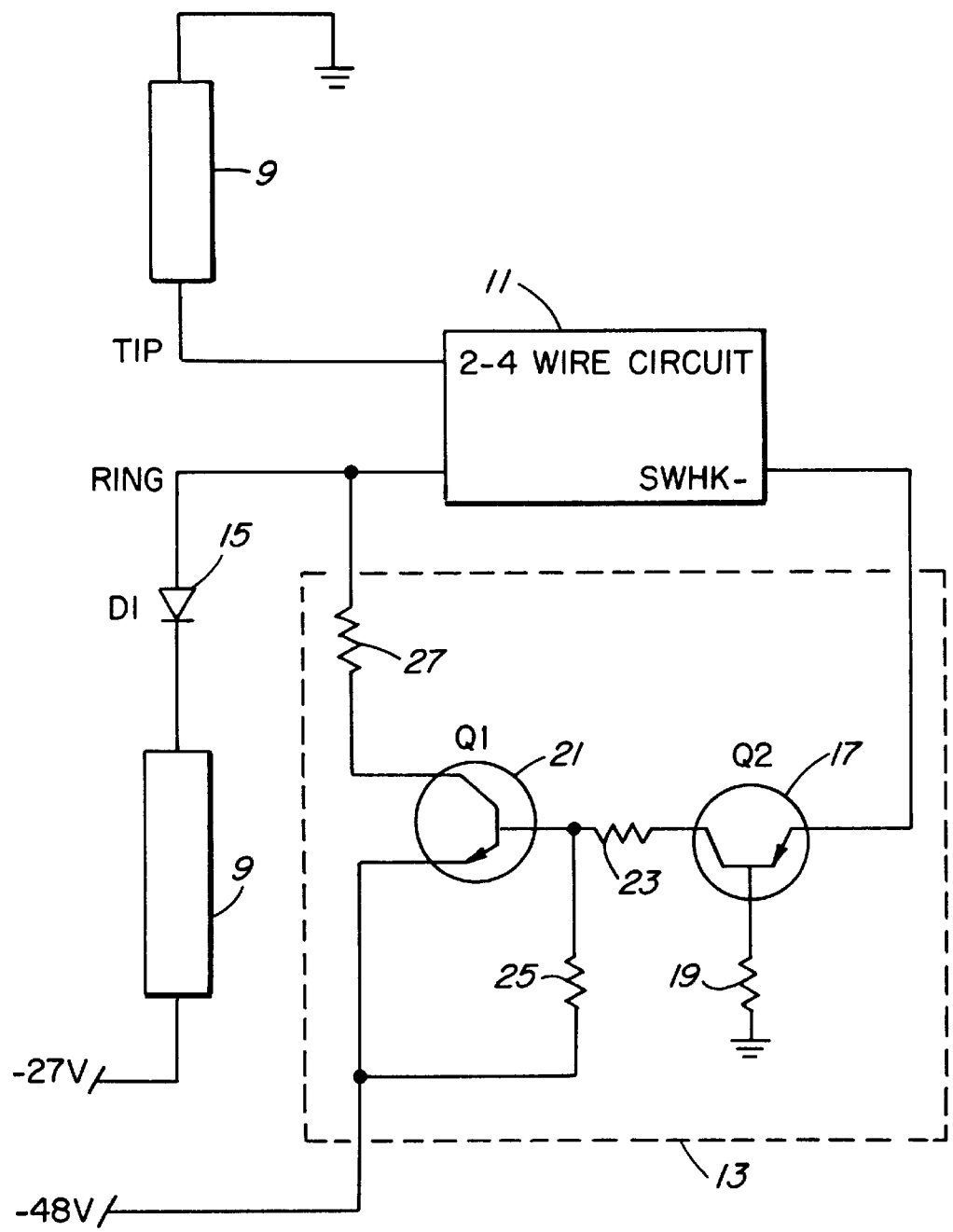

FIG. 2 illustrates a low voltage supply at −27 volts to ground as would typically be provided by a PABX, as noted above. A constant current feed circuit 9 (e.g. a pair of resistors that are large relative to resistance of a subscriber line to which it is connected) is in series with the −27 volt supply and the tip and ring leads. The tip and ring leads are connected to e.g. a 2–4 wire circuit 11 of a station apparatus.

When the station apparatus detects a low voltage, it determines that the line is busy. This can occur if the tip and ring voltage is high enough and the station apparatus goes off-hook or if another station apparatus connected to the same line goes off-hook. When this detection occurs, the station apparatus provides an off-hook signal at a terminal indicated on the 2–4 wire circuit as swhk-, in a well known manner. This signal can be a bit, or a predetermined logic voltage such as a high positive voltage logic level. The provision of this off-hook signal is well known, and need not be described further.

However, as described earlier, the −27 volt signal can be interpreted by some station apparatus as being so low that the line is in use, and provide an erroneous off-hook indication at the swhk- terminal.

In accordance with the present invention, a standard line voltage is supplied to the line, for use only during the on-hook condition. This is shown as the −48 volt line, connected via an electronic switch 13 to the ring lead. An electronic switch that operates reciprocally to switch 13 is connected in series with the ring lead to the constant current feed circuit of the high current lower voltage PBX power supply. This is preferably in the form of a diode 15, which is connected in the ring lead in the conducting direction when the current is being fed by the lower voltage supply.

Preferably the electronic switch 13 is comprised of a PNP transistor 17, to which the off-hook indication signal is applied. To this end, transistor 17 has its emitter connected to the swhk- terminal, so as to receive high logic level voltage when the station apparatus is on-hook, and low logic level voltage when the station apparatus is off-hook.

The base of the transistor 17 is connected to ground via resistor 19, and the collector is connected to the base of an NPN transistor 21 via resistor 23. The base of transistor 21 is connected to its emitter via resistor 25, and the emitter of transistor 21 is connected to the high voltage supply –48 V. The collector of transistor 21 is connected to the ring lead via resistor 27.

In operation, when the station apparatus is on-hook, the swhk- voltage is high, and transistor 17 conducts. This causes transistor 21 to conduct, allowing nominally the high voltage –48 V to appear at the ring lead. This, being more negative than the –27 volt supply, back biases diode 15, and, it operates as an electronic switch, disconnecting the –27 V conductor from the ring lead.

The station apparatus thus detects the standard high voltage, and operates correctly to determine that the line is idle.

However, when the station apparatus or another station apparatus connected to the line goes off-hook, circuit 11 detects the resulting lower voltage or detects the off-hook condition, and provides a low logic level voltage at the swhk- terminal. As a result, transistor 17 ceases conduction, causing transistor 21 to cease conduction, opening the conduction path from the –48 V supply to the ring lead. This removes the high voltage from the ring lead, and diode 15 is no longer reverse biased. It therefore becomes conductive, allowing the –27 V supply to provide the high current, required by the station apparatus to operate.

When the station apparatus goes on-hook again, the logic voltage at the swhk- goes high again, causing transistor 17 and thus transistor 21 to become conductive, reverting to the first described high voltage supply situation.

A person understanding this invention may now conceive of alternative structures and embodiments or variations of the above. All those which fall within the scope of the claims appended hereto are considered to be part of the present invention.

We claim:

1. A standby feed circuit for a PBX subscriber line having station apparatus connected thereto, said station apparatus including on-hook/off-hook indication means comprising:

(a) a constant current power feeding circuit connected to said subscriber line for supplying a voltage to said subscriber line at a voltage less than a standard central office voltage of a standard central office power feeding circuit, (b) a voltage source connected to said subscriber line for providing said standard central office voltage, (c) means for applying said standard voltage when said indication means of said station apparatus connected to the subscriber line is in an on-hook condition, (d) means for applying said voltage less than said standard voltage and disconnecting said standard voltage from said subscriber line when the station apparatus indication means is in an off-hook condition, said means for applying said standard voltage and means for applying said less than standard voltage comprise first and second electronic switches connected to said subscriber line, and means for switching said first and second standard voltage to said subscriber line when said indication means goes off-hook, and to connect said standard voltage to said subscriber line when said indication means goes on-hook, said first electronic switch is a diode in series with a current conducting line of said constant current feeding circuit, and in which said second switch provides voltage to the subscriber line in a polarity such as to reverse bias the diode, thereby disconnecting said constant current power feeding circuit in said on-hook condition, and means for enabling and inhibiting said second switch from a hook switch operation signal resulting from the station apparatus indicator means being on-hook and off-hook respectively.

* * * * *